United States Patent Office 3,313,272
Patented Apr. 11, 1967

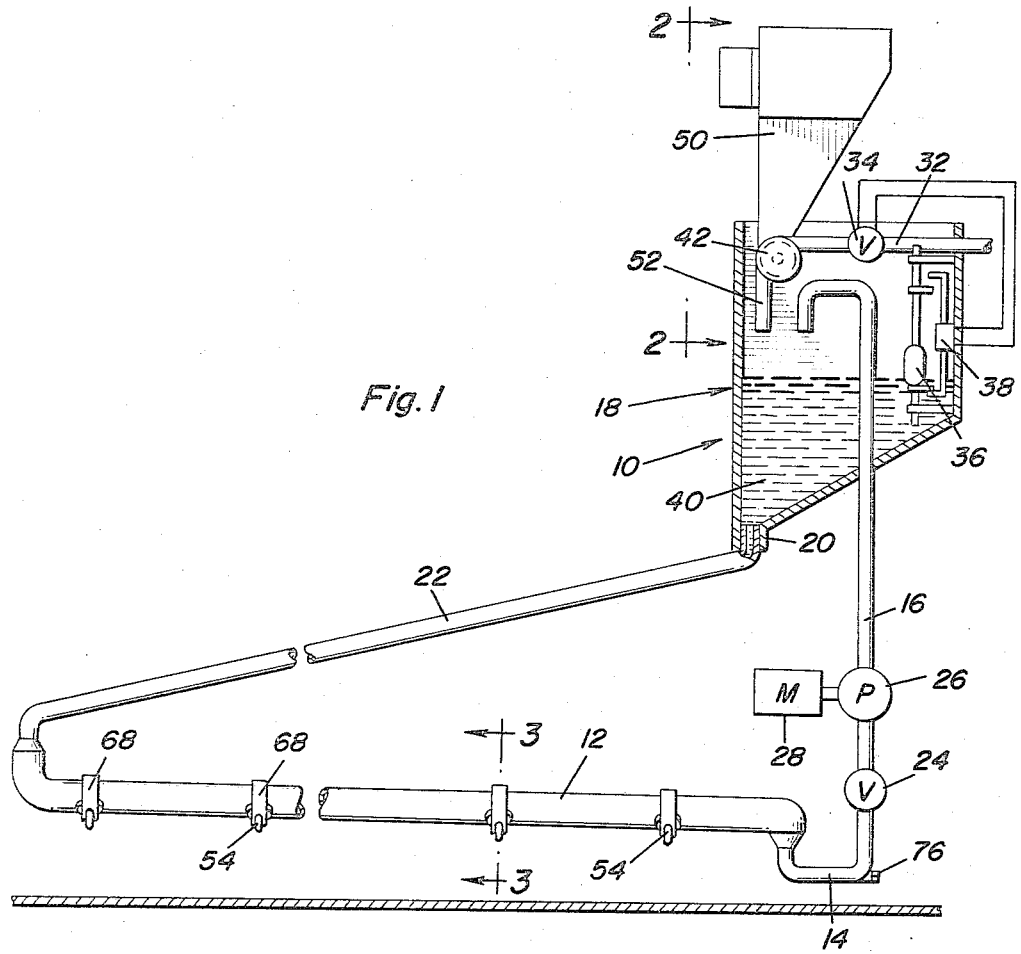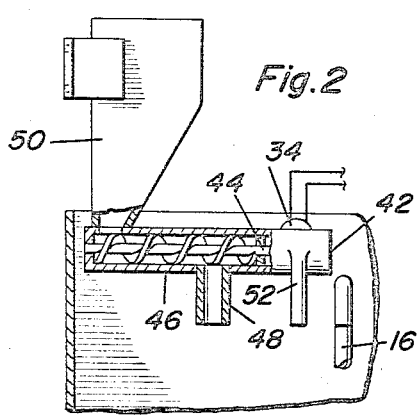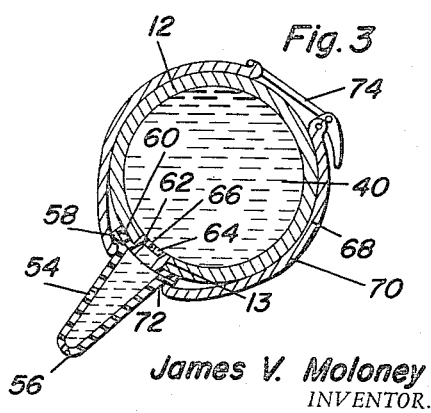

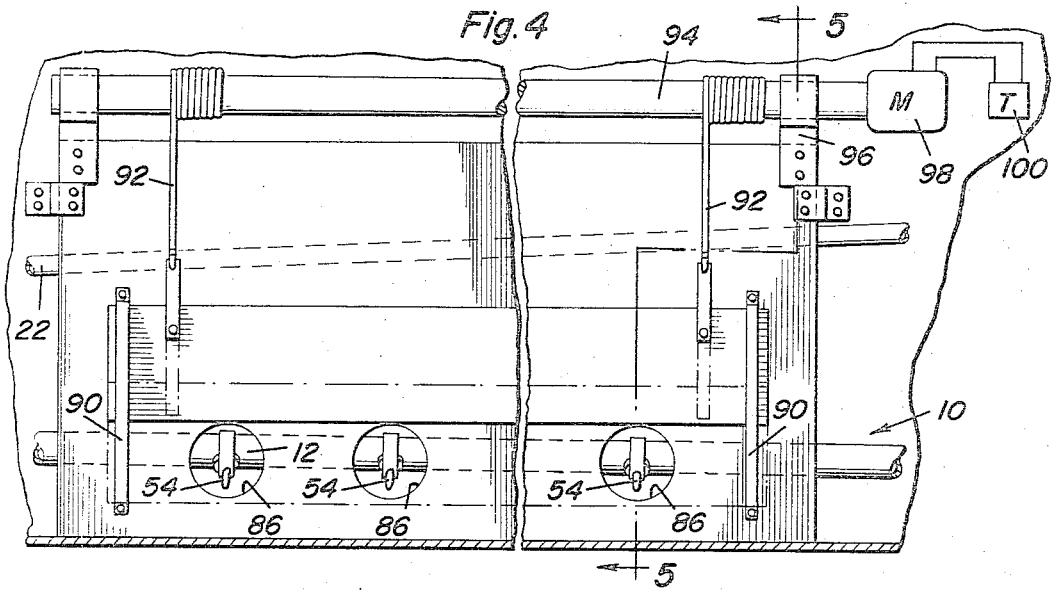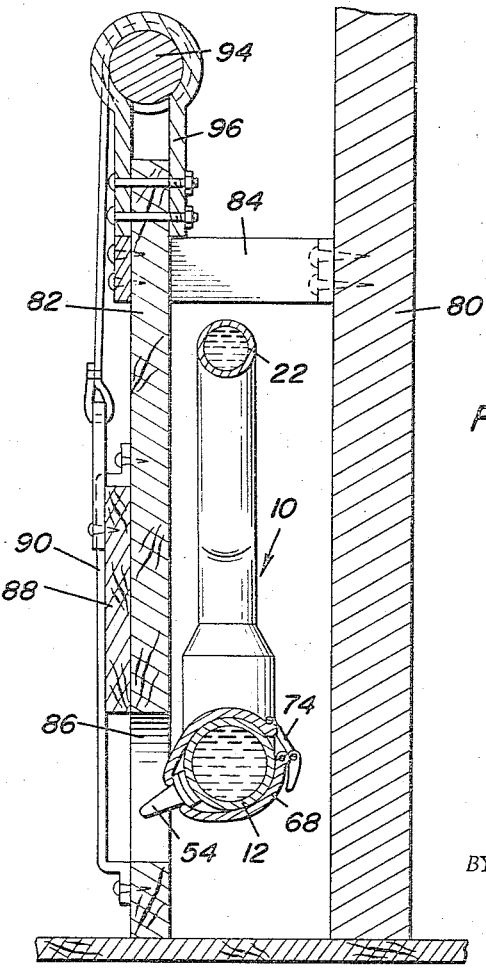

3,313,272
AUTOMATIC STOCK NURSING FEEDER
James V. Moloney, Rte. 1, Moxee City, Wash. 98936
Filed Aug. 12, 1965, Ser. No. 479,062
11 Claims. (Cl. 119—51.11)

This invention relates to a novel and useful automatic stock nursing feeder and more specifically to a device adapted to mechanically nurse small stock animals such as pigs.

Although the stock nursing feeder of the instant invention has been primarily designed for the purpose of nursing piglets, it is to be understood that it could be readily adapted so as to efficiently mechanically nurse other farm stock animals.

The stock nursing feeder of the instant invention is provided as an aid to help salvage baby pigs and can be constructed as a relatively small unit used in conjunction with the farrowing stall to mechanically nurse extra pigs. However, in many instances extra pigs appear to be best saved when removed entirely from the sow inasmuch as the extra pigs appear to prefer sow's milk as compared to prepared liquid nutrients and if the extra pigs are not removed completely from the sow they tend to fight for the most desirable liquid nutrient. Therefore, the automatic stock nursing feeder of the instant invention is constructed in a manner whereby it may be readily expanded so as to mechanically nurse the extra pigs of many sows in one central location. The nursing portion of the stock feeder is provided with suitable spaced nipple means and can be of any suitable configuration so as to be adapted to most advantageously mechanically nurse the largest number of extra pigs in a minimum amount of space. Means is provided for maintaining a constant supply of liquid nutrient at the nipple means of the stock nursing feeder and also for continuously circulating and agitating the prepared fluid nutrients utilized therein. Still further, suitable nipple blocking partition means is provided and movably supported adjacent the portion of the stock feeder upon which the nipple means are mounted. The nipple blocking partition means is mounted for movement into and out of an operative position adapted to block access to the nipple means and suitable timed power means is operatively connected to the nipple blocking partition means to effect movement of the latter into and out of the operative position on a predetermined time schedule.

Many of the prepared liquid nutrients for farm stock are commercially available in powder or granular form and adapted to be mixed with water. The automatic stock nursing feeder of the instant invention includes a liquid nutrient reservoir which is in communication with the nipple means and the reservoir is provided with water inlet means and control means for admitting water into the reservoir upon a drop of the liquid within the reservoir below a predetermined level and to terminate the entrance of water into the reservoir upon the level of liquid within the reservoir reaching a second level disposed above the first-mentioned level. Still further, the reservoir is also provided with solid nutrient dispensing means and the control means for admitting water into the reservoir is operatively connected to the solid nutrient dispensing means in a manner operable to dispense solid nutrients into the reservoir in proportion to the amount of water dispensed into the reservoir.

The main object of this invention is to provide an automatic stock nursing feeder which will be capable of nursing extra pigs and thereby salvaging these baby pigs by providing them with the necessary liquid nutrients which they might otherwise be restricted from receiving.

Another object of this invention is to provide an automatic stock nursing feeder which is adapted to be constructed as a relatively small unit so as to be utilized in conjunction with a single farrowing stall in addition to being readily expandable so as to be utilized in conjunction with a special stall containing the extra pigs from more than one sow.

Yet another object of this invention is to provide a device in accordance with the preceding objects and including means for maintaining a constant supply of liquid nutrients available for nursing stock animals.

Another important object of this invention is to provide an automatic stock nursing feeder in accordance with the immediately preceding objects and including means by which predetermined quantities of water and solid nutrients in water-soluble granular form or the like may be automatically introduced into the liquid nutrient reservoir of the nursing feeder in order to maintain the level of liquid nutrients in the reservoir within predetermined upper and lower limits.

A still further object of this invention is to provide an apparatus in accordance with the immediately preceding object and including means by which the liquid nutrients within the stock nursing feeder may be agitated continuously if desired in order to ensure a supply of properly mixed liquid nutrients at all times.

A final object of this invention to be specifically enumerated herein is to provide an automatic stock nursing feeder in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the automatic stock nursing feeder of the instant invention shown with portions thereof being broken away and illustrated in vertical section in order to more clearly illustrate the structural details thereof;

FIGURE 2 is an enlarged fragmentary vertical sectional view taken substantially upon the plane indicated by the section line 2—2 of FIGURE 1;

FIGURE 3 is an enlarged vertical sectional view taken substantially upon the plane indicated by the section line 3—3 of FIGURE 1 and illustrating the manner in which the various resilient nipple means of the stock nursing feeder are removably supported in communication with the interior of a supply conduit;

FIGURE 4 is a side elevational view of an accessory or attachment for the stock nursing feeder shown operatively associated with the latter and provided to intermittently block access to the nipple means of the stock feeder by the associated farm stock; and FIGURE 5 is an enlarged fragmentary vertical sectional view taken substantially upon the plane indicated by the section line 5—5 of FIGURE 4.

Referring now more specifically to the drawings, the numeral 10 generally designates the stock nursing feeder of the instant invention. The feeder 10 includes a supply conduit 12 having a plurality of outlet openings 13 formed therein and spaced longitudinally thereof. The supply conduit is defined by a substantially straight section and is downwardly inclined at one end and directly communicated with the lower end or sump portion 14 of a standpipe 16 whose upper end opens into a liquid nutrient reservoir generally referred to by the reference numeral 18. The liquid nutrient reservoir 18 includes an outlet at 20 with which the inlet end of an outlet pipe 22 is communicated, the outlet end of the outlet pipe 22 being in communication with the upper end of the supply conduit or section 12.

A manually operable valve assembly 24 is disposed in the standpipe 16 immediately above the sump portion 14 and may be adjusted to vary the rate of flow of liquid within the standpipe 16 upwardly into the reservoir 18. In addition, pump means in the form of any suitable liquid pump 26 is also disposed in the standpipe 16 and includes a driving motor 28. The pump means is operative to pump liquid upward through the standpipe 16 and into the reservoir 18.

The motor 28 may be provided with any suitable control, either manual or automatic, for effecting operation of the motor 28 for any given duration and at selected times during any period of the day.

A fresh water inlet pipe 32 opens into the reservoir 18 and has an electrically actuatable control valve 34 disposed therein. A vertically reciprocal float assembly 36 is disposed within the reservoir 18 and operatively associated with an electric switch assembly 38 electrically connected to the valve 34 for actuation of the valve 34 to admit water into the reservoir 18 when the level of the liquid 40 disposed therein drops below a predetermined level and for terminating the entrance of water into the reservoir 18 upon the level of the liquid 40 reaching a level in the reservoir a predetermined distance above the first-mentioned level.

The fresh water inlet pipe further has a water turbine assembly 42 disposed therein including an output shaft 44 drivingly connected to an auger type conveyor screw 46 operatively associated with a granular solid nutrient reservoir outlet 48 of a nutrient reservoir 50.

It is to be understood that the auger type conveyor screw 46 is operative to discharge granular solid nutrients from the reservoir 50 out of the outlet 48 in direct proportion to the amount of water being discharged from the outlet 52 of the water turbine assembly 42. Accordingly, upon the level of the liquid 40 within the reservoir 18 reaching a predetermined low level, the float 36 will actuate the switch 38 which will in turn open the valve 34 to admit fresh water into the reservoir 18 through the water pipe 32. The flow of fresh water through the water pipe 32 will cause the output shaft 44 of the water turbine assembly 42 to rotate thereby driving the conveyor screw 46 and causing the granular solid nutrients within the reservoir 50 to be dispensed out of the outlet 48.

As can best be seen in FIG. 3 of the drawings, the conduit or section 12 is provided with laterally outwardly projecting resilient nipple means 54 which are provided with suitable openings 56 at their outer ends yieldingly urged to closed positions by the resiliency of the nipple means 54 in a manner maintaining the openings 56 closed against the head pressure of the liquid 40 in the reservoir 18.

The nipple means 54 are provided with annular collars 58 abutted against the outer peripheral portions of sealing washers 60 constructed of resilient material and including diametrically reduced neck portions 62 snugly received in the corresponding openings 13. The inner ends of the neck portions 62 are provided with resilient end walls 64 including apertures 66 also yieldingly urged to closed positions by the resiliency of the end walls 64 for further resisting the head pressure of the liquid 40 in the reservoir 18 and eliminating accidental flow of the liquid 40 outwardly of the conduit 12 through the nipple means 54.

The nipple means 54 and washers are secured to the conduit or section 12 by means of readily releasable clamp assemblies 68 including an elongated strap portion 70 suitably apertured as at 72 to receive the corresponding nipple means 54 and connected together at opposite ends by means of a releasable latch 74.

Accordingly, it may be seen that the nipple means 54 may be readily removed for cleaning and/or replacement when desired and that suitable flushing apparatus may be readily directly communicated with the section 12 for cleaning purposes. Still further, it may be seen from FIG. 1 of the drawings that the sump portion 14 includes a removable drain plug 76 to facilitate drainage of the liquid 40 from the feeder 10 prior to flushing the latter out with a suitable cleaning fluid.

With attention now directed more specifically to FIGS. 4 and 5 of the drawings, if it is desired to provide a means whereby the stock being nursed may be prevented from gaining access to the nipple means 54 of the feeder 10 during given time intervals, a suitable support 80 may be erected adjacent the conduit 12 and utilized to support a mounting member 82 therefrom by means of suitable mounting brackets 84. The mounting member 82 may be provided with suitable apertures 86 therein through which the stock to be nursed must gain access to the nipple means 54 of the feeder 10 and blocking partition means in the form of a partition 88 is supported for vertical reciprocation relative to the mounting member 82 by means of suitable mounting slides 90. The opposite ends of the partition 88 are supported by means of elongated flexible tension members 92 and the end of each tension member 92 remote from the partition 88 may be wound about a shaft 94 journaled from the mounting member 82 in any convenient manner such as by clamp journals 96. A suitably supported motor 98 is supported in any convenient manner (not shown) in fixed position relative to the mounting member 82 and is drivingly connected to the shaft 94. The motor 98 is of the reversible type and has an electrical timer 100 operatively connected thereto to effect alternately reversing operation of the motor 98 at given time intervals. Of course, upon the lowering of the partition 88 from the raised positions illustrated in FIGS. 4 and 5 of the drawings the apertures 86 in the mounting member 82 through which stock must gain access to the nipple means 54 will be covered by means of the partition 88 thereby preventing access to the nipple means 54. And then, upon the next operation of the motor 98 the partition 88 will be raised again affording access to the nipple means 54.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automatic stock nursing feeder comprising a supply conduit including a section having nipple means operatively associated therewith adapted to nurse young farm stock with fluid disposed within said conduit, a fluid supply reservoir including an inlet and an outlet, one end of said conduit being operatively communicated with said outlet to receive fluid from within said reservoir, the other end of said conduit being operatively communicated with said inlet for discharging liquid into said reservoir from said conduit, pump means operatively connected with said conduit for pumping liquid through said conduit from said one end to said other end thereof, fresh liquid inlet means adapted for communication with a suitable source of liquid under pressure and operatively associated with said reservoir for admitting fresh liquid thereinto, supplemental nutrient reservoir means including outlet means operatively associated with said fluid reservoir for discharging nutrient into said fluid reservoir to be mixed with the fluid disposed therein, said nutrient reservoir means including driven nutrient metering means operative to meter nutrient from said outlet means into said liquid reservoir, said fresh liquid inlet means including fluid motor means drivingly connected to said metering means for driving the latter in response to the flow of liquid through said fresh liquid inlet means into said liquid reservoir and the resultant operation of said fluid motor means.

2. The combination of claim 1 including control means operatively connected between said fresh liquid inlet means and said reservoir for admitting fresh liquid into said reservoir in response to a drop of liquid level in said reservoir below a predetermined level and for terminating the entrance of fresh liquid into said reservoir in response to a rise in the liquid level in said reservoir to a second level spaced above the first-mentioned liquid level.

3. The combination of claim 1 wherein said section of said conduit is gradually inclined downwardly toward the end thereof leading to said pump means and said reservoir is disposed in elevated position relative to said section so that the working level of liquid in said reservoir between predetermined high and low liquid levels will be above the upper end of said section.

4. The combination of claim 3 wherein said nipple means include resilient portions projecting outwardly of said conduit and have liquid outlet openings formed therein adapted to remain closed against the head pressure of liquid in said reservoir and said conduit.

5. The combination of claim 1 including an adjustable throttling valve in said conduit downstream of said nipple means and upstream of said reservoir operative to adjustably vary the rate of flow of liquid through said conduit downstream of said nipple means.

6. The combination of claim 1 wherein said section has a plurality of outlet openings formed therein and said nipple means are removably secured to said section in fluid tight sealed engagement with the portions of said section disposed about the openings formed therein.

7. The combination of claim 1 including blocking partition means supported adjacent said section for movement into and out of an operative position adapted to block access to said nipple means by said farm stock, and partition movement effecting means operatively connected to said blocking partition means for moving the latter into and out of said operative position.

8. The combination of claim 7 wherein said movement effecting means includes electric motor means.

9. The combination of claim 8 including timer means operatively associated with said motor means and operative to time actuation of said motor means and thereby time the duration of said partition means in said operative position.

10. The combination of claim 1 wherein said section of said conduit is gradually inclined downwardly toward the end thereof leading to said pump means and said reservoir is disposed in elevated position relative to said section so that the working level of liquid in said reservoir between predetermined high and low liquid levels will be above the upper end of said section, said nipple means including resilient portions projecting outwardly of said conduit and having liquid outlet openings formed therein adapted to remain closed against the head pressure of liquid in said reservoir and said conduit, said nipple means further including liquid passage blocking partition means disposed inwardly of said portions projecting outwardly of said conduit, also constructed of resilient material, and having normally closed openings formed therein further insuring against accidental discharge of liquid from said conduit through said nipple means.

11. The combination of claim 1 wherein said metering means comprises an auger conveyor assembly disposed to receive nutrient from said nutrient reservoir means by gravity and including an auger screw member driven by said fluid motor.

References Cited by the Examiner
UNITED STATES PATENTS

| | | | |
|---|---|---|---|
| 2,642,837 | 6/1953 | Schroeder | 119—52 |
| 2,782,760 | 2/1957 | Wolfe | 119—51.5 |
| 2,829,871 | 4/1958 | Vandenberg | 119—51 X |
| 3,037,481 | 6/1962 | Kloss | 119—71 |
| 3,081,738 | 3/1963 | Heron | 119—71 |
| 3,124,104 | 3/1964 | Carpenter | 119—63 |
| 3,180,321 | 4/1965 | Aldinger | 119—51 |
| 3,192,902 | 6/1965 | Gammil | 119—51.11 |
| 3,196,835 | 7/1965 | Bergevin | 119—51.11 |
| 3,216,397 | 11/1965 | Pickard | 119—71 |

FOREIGN PATENTS 1,313,236  11/1962  France.

SAMUEL KOREN, *Primary Examiner.*
ALDRICH F. MEDBERY, *Examiner.*